US006185621B1

(12) United States Patent
Romine

(10) Patent No.: US 6,185,621 B1
(45) Date of Patent: Feb. 6, 2001

(54) DIRECT COPYING BETWEEN DISK BLOCKS IN MEMORY ONTO A NETWORK AS SEQUENTIAL ACCESS FILES

(75) Inventor: Jeff E. Romine, Sandy, UT (US)

(73) Assignee: Philips Electronics N.A. Corp., New York, NY (US)

( * ) Notice: Under 35 U.S.C. 154(b), the term of this patent shall be extended for 0 days.

(21) Appl. No.: 09/002,560

(22) Filed: Dec. 31, 1997

Related U.S. Application Data

(60) Provisional application No. 60/041,522, filed on Mar. 25, 1997.

(51) Int. Cl.[7] .............................. G06F 15/16; G06F 13/00; H04N 7/10
(52) U.S. Cl. ................................ 709/231; 348/7; 711/161
(58) Field of Search ..................................... 709/231, 219; 348/7; 711/161–162, 165

(56) References Cited

U.S. PATENT DOCUMENTS

| | | | |
|---|---|---|---|
| 4,947,367 | * | 8/1990 | Chang et al. ........................ 710/65 |
| 4,949,187 | * | 8/1990 | Cohen ................................ 386/69 |
| 5,276,840 | * | 1/1994 | Yu ..................................... 710/35 |
| 5,305,438 | * | 4/1994 | MacKay et al. .................... 345/511 |
| 5,506,979 | * | 4/1996 | Menon ............................... 711/112 |
| 5,535,381 | * | 7/1996 | Kopper .............................. 710/52 |
| 5,539,660 | * | 7/1996 | Blair et al. ......................... 370/380 |
| 5,544,327 | * | 8/1996 | Dan et al. .......................... 709/234 |
| 5,553,005 | * | 9/1996 | Voeten et al. ...................... 711/112 |
| 5,577,242 | * | 11/1996 | Yamaguchi et al. ............... 707/205 |
| 5,583,561 | * | 12/1996 | Baker et al. ....................... 348/7 |
| 5,646,676 | * | 7/1997 | Dewkett et al. ................... 348/7 |
| 5,724,543 | * | 3/1998 | Ozden et al. ...................... 711/114 |
| 5,732,211 | * | 3/1998 | Efron et al. ........................ 709/200 |
| 5,805,821 | * | 9/1998 | Saxena et al. ..................... 709/231 |
| 5,808,607 | * | 9/1998 | Brady et al. ....................... 345/327 |
| 5,860,088 | * | 1/1999 | Benhase et al. ................... 711/112 |
| 5,870,553 | * | 2/1999 | Shaw et al. ........................ 709/219 |
| 5,920,702 | * | 7/1999 | Bleidt et al. ....................... 709/231 |

* cited by examiner

Primary Examiner—Zarni Maung
Assistant Examiner—Andrew Caldwell
(74) Attorney, Agent, or Firm—Michael E. Belk

(57) ABSTRACT

In the multimedia network, in order to archive or play multimedia data for a production, a multitude of disk file blocks are retrieved from a multitude of files striped across a multitude of disk storage systems through a commutator to the input of an input/output unit. The disk file blocks are copied from the input into disk file blocks in a buffer of the memory of the unit. Then the unit creates a address-size list of data portions in the buffer for archiving the disk files of the production or for playing a multimedia data stream for the production. Then the unit executes a copy command given the address of the list which uses indirection for copying the specified portions of the buffer onto an output of the unit to store the data into an archival tape storage system or to play the production in a multimedia data stream. Also, using the above method, a production may be simultaneously archived and played by the same unit. In a related process, in order to restore the archived production or to record a multimedia data stream, the unit creates an address-size list for copying data from an input of the unit into portions of disk file blocks in a buffer in the memory of the unit. Then the unit executes a copy command given the address of the list which uses indirection for copying the data from the input of the unit into the specified portions of the buffer. Then the unit copies the disk file blocks onto an output through the commutator into disk files striped across a multitude of disk storage systems. Also, these two processes may be utilized in the same unit to simultaneously both restore a production from archival tape storage and to play the production as a multimedia data stream.

14 Claims, 8 Drawing Sheets

DIRECT COPYING BETWEEN DISK BLOCKS IN MEMORY ONTO A NETWORK AS SEQUENTIAL ACCESS FILES

Applicant claims the benefit of his United States provisional patent application, Ser. No. 60/041,522, filed Mar. 25, 1997.

FIELD OF THE INVENTION

This invention relates to data archiving and restoring and relates most closely to the field of multimedia data servers.

BACKGROUND

The invention herein involves computer systems. A computer system normally includes a central processing unit (CPU), a permanent memory unit, a fast memory unit, input and/or output (I/O) units, storage units, and a user interface. Programs contained in the memory, control the operation of the CPU to operate the computer. Whenever the computer is started, the CPU is initially controlled by a small program contained in the permanent memory. This startup program loads an operating system and any other necessary programs and data from files in the storage units into the fast memory. The CPU is able to alter any data contained in fast memory and control the I/O units to transfer data between the fast memory and peripherals such as the storage units, printers and user interface components. During operation, all or parts of data files are loaded into the fast memory. The contents of the data files are then changed, and the new versions of the data files are saved back into storage.

Memory generally refers to electronic information storage. When discussing memory or storage, both programs and data files are referred to collectively as either "data" or "information". There are two main type of memory: read only memory (ROM) and random access memory (RAM). RAM tends to be much faster than ROM, but also tends to be highly volatile, meaning that it must be regularly written to in order to prevent data loss. ROM, on the other hand, is permanent, so that any data stored in ROM is available when the computer is first turned on.

There are many different types of ROM. Some kinds of ROM are created with an unchangeable program built in. Programmable ROM (PROM), on the other hand, can be written to, but this usually requires high voltage, and may be difficult to erase (requiring, for example, ultraviolet light). Permanent memory may also be rewrittable memory such as electrically erasable ROM (EEPROM), battery backed SRAM, or flash memory.

Faster, more volatile types of memory are known as random access memory (RAM). Types of RAM include static RAM (SRAM), in which data is stored using circuits with several transistors, and dynamic RAM (DRAM), in which information is stored as charges in capacitors. The capacitors of DRAM must be regularly recharged to prevent data loss. The data stored in fast memory is usually lost when the system is turned off. Random access refers to the fact that any word i.e. 2 or 4 bytes (1 byte equals 8 bits of data), of the memory can be arbitrarily selected and immediately read or written to in one operation at any time without reading through the rest of memory. Note that permanent memory (ROM) is also random memory in this sense.

ROM is normally built into a motherboard of the computer. Fast memory is commonly provided on small boards that are mounted in memory slots on the motherboard of the computer. Flash memory PC cards are available that insert into PCMCIA slots commonly found in laptop computers, and small computer systems often use ROM cartridges especially for computer games.

Storage usually refers to units which contain computer media onto which the data and programs are stored. The computer media may be magnetic media in which a layer of plastic is coated with a layer of metal alloy oxide (e.g. iron rust) which is magnetic but not electrically conducting. Bits of data may be written to such magnetic media by magnetizing the particles at a storage point on the layer in a particular direction by controlling current to a magnetic write head moving closely over the point. Data may be read from magnetic media by detecting the effect of the magnetization on electrical current output from a magnetic read head. Alternately the media may be optical media in which bits may be written by directing a higher power laser beam at a point in a layer of the media to change the reflectivity of the layer at that point and read by detecting the amount of reflected light when a lower power laser is directed at the point on the layer. Some storage devices, such as hard disk drives, include a fixed media which can not be removed. In other devices, such as floppy disk drives, tape drives, and optical disk drives, the media can easily be removed and replaced by other media containing different programs or data files.

Some digital storage devices, such as hard disk drives and some types of optical disk drives, provide high speed access to any arbitrary individual block of data in the media of the device. This capability is referred to as random access. Unlike memory, no storage device allows random access to individual words (e.g. 2 or 4 bytes), but random access storage devices do allow relatively fast access to individual blocks (e.g. 512 bytes).

Other types of digital storage devices, such as digital tape drives, only allow access to blocks of data in a sequence. For example, a tape may have to be wound for hundreds of meters in order to reach a particular block of data. Thus, these types of storage devices are only useful for accessing large sequential sections of data, since random access to individual blocks is either not available or too slow for practical use. Such devices are referred to as sequential access storage. Common sequential access devices have removable media which is relatively inexpensive, allowing the storage of large amounts of data at relatively low cost.

Some storage drives are built-in or internal and require opening the computer to install or remove. Some other storage devices are external and plug into ports of the computer to be easily installed and removed. High performance systems often have hard drives installed in enclosures that slide into internally mounted frames for convenient replacement.

The unreliability of high speed, random access storage devices is a major problem in data storage. Certain mechanical parts of a storage drives, such as positioning motors and bearings, are not nearly as reliable as solid state devices. In addition, because the data on a hard disk is so easily accessible, computer viruses, software failures, and operation errors can easily damage stored data. For this reason, important data is often copied onto removable media which is removed from the system so that no failure of the system can directly damage the data. This process is referred to as backing-up the data. If there is a failure in the computer system, the data on the system storage device can then be restored by copying the backed-up data from the removable media.

Also, in order to increase reliability of hard disk storage, computer systems used for critical, changing information commonly use a system known as a redundant array of inexpensive disks (RAID). In a RAID system, instead of being stored on a single hard disk, each data file is about evenly spread out across several data disks by a RAID controller card. In addition, parity information is written to a parity disk, so that if any single disk drive fails, there will be no loss of data or access to the data. Access to the disks is cycled across the data disks by the RAID disk controller and parts of each disk file is read or written in turn to each data drive. This allows a large number of smaller inexpensive disks to operate as though they were one large disk drive. This process of spreading the data across multiple devices is known as striping. Typically in a RAID system, the disk drives are networked to a disk controller card using a small computer interface (SCSI) peripherals network. Commonly available SCSI type RAID disk controllers access up to 13 data disk drives and one parity disk drive and inexpensive SCSI disk drives holding 23 GB (gigabytes=1 billion bytes) are available thus providing up to 299 GB of highly reliable storage in one hard disk storage system (HDSS).

The cost of high speed, random access, storage devices is one of the major costs of computer systems. Because the cost of sequential access storage (including the removable media) is much lower per unit of storage than the cost of high access speed storage, it is common to move data (programs files and data files) which are not immediately needed onto removable media in sequential digital storage devices. The removable media is then removed from the drive and replaced with other media. This process of temporarily moving files from random access storage devices onto media in sequential devices, and then removing the media from the system, is known as archiving. When the data are again required, then the media is loaded into the sequential device, and the files are copied back onto the high access speed storage devices in a process known as restoring the data.

Digital tape units are especially popular for backing-up and for archiving digital data because of the extremely low cost of tape. High quality tape units which write digital data at 3 million bytes per second (10 MBs) are commonly available.

The invention also relates to computer networks. In order to reduce the cost of data processing systems, several computers can be linked using communications cables. This allows the computers to use some parts of other computers and some or all of the data stored on other computers. Such interconnected computers are referred to as computer networks. The individual computers usually referred to as nodes of the network, and the communication paths (e.g. cables) and communication equipment are referred to as a communication network. The telephone system is an example of a communications network to which computer nodes may be connected, using modems or ISDN devices, to form a computer network. Other common communication networks include Ethernet, ARCnet, and token ring networks. In a computer network, files, storage space, printers and other resources of nodes referred to as servers, can be used by other computer nodes referred to as clients.

The invention is especially useful in the cable television industry. Cable television distribution has traditionally utilized semi-automated controls. Most cable distributors receive channels from program producers through satellite downlinks, video tapes, and dedicated lines. At the cable distributor, tapes are loaded into a VCR player, which is then manually queued and started to provide a program signal. Signals from the various program sources are routed from source cables by manually controlled switchers through modulators to provide each program at a different frequency channel, and the modulated signals combined into a distribution cable. This equipment used to provide the signals into the cable television distribution system, is commonly known as the head-end. For each channel with local commercials, a cartridge for each local commercial is loaded into a cartridge tape machine, which has been automatically queued and programmed to automatically play the correct local commercials on the correct channel at a particular time. The cable distributor may simultaneously distribute over 100 channels through a cable system.

Many cable operators are preparing to introduce multi-casting into their cable systems. In multi-casting, different programs and commercials are broadcast to different parts of the cable system or to different types of viewers (i.e. viewing customers). For example, different neighborhoods may receive programs specific to its demographics and receive commercials specific to its local businesses. Preferably, the same show could be broadcast at overlapping times depending on the commercials scheduled in the different portions of the cable system. Multi-casting requires a more automated approach since a different set of operations is required for each local area, so that many more simultaneous operations are needed.

Video servers, also known as multimedia servers, are a solution to the complexity of operating a multi-casting system. A video server can easily play the same or different local commercials on several different local portions of the cable system at simultaneous or overlapping times. For example, local commercials may be loaded from tape into the disk storage of the video server, and the video server can be programmed to automatically play the correct commercial in the correct channel for each local area. Different programs can also be loaded into the video server to automatically play in different local areas at different times.

For example, Philips produced Media Pool video servers which allow a large number of video production peripheral devices to simultaneously access a large number multimedia productions. Typical video peripherals include film scanners, frame editors, digital tape archival systems, video cameras, VCR units, program distribution links, and cable distribution systems (head-ends).

Instead of being stored on a single RAID hard disk system, each data file is about evenly spread out across multiple RAID systems called hard disk storage systems (HDSSs). To give each video peripheral device access to all the data in all the HDSSs, each device is connected to one or more input-output (I/O) ports. A computer controlled switching unit called the commutator then cycles the connections between the I/O ports and the HDSSs, so that each HDSS is regularly switched from I/O port to I/O port and the I/O port are similarly switched from HDSS to HDSS. As the I/O port for a given device is cycled by the commutator across the storage systems, parts of the file are read or written in turn on each storage system. This allows a large number of peripheral devices to simultaneously have access to the same file without conflicts. This process of distributing files across all the HDSSs is referred to as striping. With HDSS striping, a tape drive can back-up a video file while the same part or another part of the same file is being used by a frame editor and also the same or other parts of the file are being broadcast to different portions of a multi-casting cable system, for example.

For each production (program or commercial), several files of multimedia data must be stored in the HDSSs of the video server. Typically, a single production requires a video file and up to four audio files. Furthermore, there may be several auxiliary files specifying additional information, including arrangement information and time code information describing how to arrange the information from the video and audio files to form a multimedia stream and when to broadcast portions of the information to play the stream.

In order to play the multimedia production, the time code, arrangement, video, and audio data must first be read from respective files stored in the HDSSs. The video and audio data is then broadcast in a predetermined order at predetermined times according to the arrangement and time code information to play the multimedia data stream.

Successful operation of current multimedia servers requires careful planning. The loading or restoration of any required multimedia productions must be completed before the scheduled broadcast time. Furthermore, there must be sufficient hard disk storage space for restoring the required productions so that other productions may have to be archived. Finally, restoration often requires other computer resources (e.g. I/O ports, tape drives, bandwidth through the commutator) which might not be available at all times.

Many cable systems offer a service known as pay-per-view in which subscribers who wish to see a special production can call a provider to order access to the production, often up to just a few minutes before the production starts. Typically, a small group of productions are repeated sequentially on a channel so that viewers who wish, may view the production at different times.

Many cable providers desire to offer an improved pay-per-view service known as near-video-on-demand, in which the same production is broadcast on multiple channels starting at staggered times, so that a viewer who desires to see a production and misses the start of the production will not have to wait through the entire length of the production before seeing the next available starting of the broadcast. In order to provide near-video-on-demand directly from tape, a multitude of copies of each production and a separate player for each channel will be required. Thus, it is economical to load such productions onto a video server which can simultaneously play different portions of the same copy of the production onto different channels.

Many cable systems are also preparing to offer a service known as video-on-demand in which a subscriber requests a particular multimedia production from hundreds or even thousands of available productions, and then the provider broadcasts the production to that viewer through the cable as quickly as it can be made available.

Preferably, in addition to play, the service should provide for viewer commands for so called trick play functions such as pause, frame-by-frame forward and reverse, slow motion forward and reverse, play in fast forward and reverse, very fast forward (wind) and reverse (rewind, and other multimedia manipulations currently provided by advanced VCR machines. Furthermore, the random access storage of a video server would allow providing random access viewer commands such as go to a scene or jump forward or backward a given playing time, and similar functions provided on advanced CD changers. It would be prohibitively expensive to operate such a system using a separate player and separate taped copy of a production for each potential simultaneous viewer in such a system.

Multimedia productions require large amounts of digital storage. One hour of programming of regular definition television, in motion JPEG format for instance, may require as much as 6 GB of storage, and video-on-demand customers may demand to select from thousands of hours of programming. Thus, it is not practical to store all of the desired productions in random access storage. Thus, in a video server, most productions must be kept in archival storage, so that viewers who request an archived production must wait while the production is restored from archival storage.

The invention is also related to the methods used to handle data in a video server. The restoration and archiving processes are complex and require extensive memory and processor resources. In archiving, the video server sends commands to the HDSSs requesting portions of files required for a production. The server copies the data in blocks formatted for disk storage from a network input communicating with the HDSSs into an input buffer in the server memory. The server reads the data from the input buffer, reformats the data into larger blocks for sequential storage, and writes the data into an output buffer in the server memory. The server sends commands to a sequential storage system to store the data and copies the data from the the output buffer onto an output to the sequential storage system.

In restoring, the video server sends commands to a sequential storage system requesting portions of a file required for a production. The server copies the data in blocks formatted for sequential access storage from an input from the sequential storage system into an input buffer in the server memory. The server reads the data from the input buffer, reformats the data into smaller blocks for sequential storage, and writes the data into an output buffer in the server memory. The server sends commands to the HDSSs to store the data and moves the data from the the output buffer onto an output to the HDSSs.

The recording and playing processes for multimedia productions are similarly complex and again require extensive memory and processor resources. In playing, the video server receives commands to play a multimedia production and the video server sends commands to the HDSSs requesting portions of files required for playing the production. The server copies the data in blocks formatted for disk storage from an input from the HDSSs into an input buffer in the server memory. The server reads the data from the input buffer, reformats the data into the format required for a multimedia data stream, and writes the data into an output buffer in the server memory. The server copies the data from the the output buffer onto a video output according to timing information stored in the auxiliary files.

In recording, the video server receives commands to record a multimedia data stream and the server begins copying the data from an input for the stream into an input buffer in the server memory, along with timing information related to when the data was received. The server reads the data from the input buffer reformats the data into blocks for disk storage and writes the data into an output buffer in the server memory. The server sends commands to the HDSSs to store the data and copies the data from the the second buffer onto an network output to the HDSSs.

Those skilled in the art are directed to U.S. Pat. No. 5,539,660 to Bird et al. describing a multimedia server with a cartridge tape unit. U.S. patent application Ser. No. 08/641, 153, now U.S. Pat. No. 5,732,211, entitled "Advanced Data Server and Server System" describes another multimedia server. U.S. Pat. No. 5,305,438 describes a video storage system with an archival tape unit, and U.S. Pat. No. 4,949, 187 describes a video server with an archival tape system. These above citations are hereby incorporated in whole by reference.

SUMMARY OF THE INVENTION

It is an object of the invention to provide a multimedia data server requiring less memory for archiving and restoring multimedia productions.

It is another object to provide a multimedia data server requiring less processor time for archiving and restoring multimedia productions.

It is also object to provide a multimedia data server requiring less memory for recording and playing multimedia productions.

It is a further object of the invention to provide a multimedia data server requiring less processor time for playing and recording multimedia productions.

In the invention herein, the operations of the multimedia server during archiving and restoring are modified to reduce memory and processing requirements. The server stores multimedia data in a buffer in the memory of the server in blocks formatted for random access storage (disk format). This allows the blocks to be efficiently moved between random access storage and the memory buffer at the high speeds available for such random access storage (e.g. 40 MBs).

During archiving in the invention, the server reads the data from the random access storage formatted blocks in the memory buffer and writes such data in a format for sequential access storage onto a network output that communicates with the sequential access storage system. That is, the data is not stored in an output buffer, but is directly written as reformatted data onto the output of the server. This reduces memory and processor resources required for archiving the data. Note that the sequential storage system may have a buffer, for example in a tape controller, to allow writing to network output to the sequential storage system at a higher speed than the data can be written to tape in the system. The invention does not directly effect the need for such a buffer, but rather, generally reduces the total amount of memory buffer needed in the system in order to provide the same level of performance.

In a preferred embodiment, the server first creates a list of portions of the data in the memory buffer to move to the network output, communicates with the sequential storage system, and then executes the list and any handshaking required with the sequential storage system in a process to archive the data. The items in the list contains an address of a portion of the random access storage formatted data in the memory buffer and contains the size of the respective portion. Preferably a single architected instruction executes the archiving list and the list is allowed to contain an arbitrary number of address-size items.

During restoration in the invention, the sequential formatted data is read from a network input that communicates with the sequential storage system and such data is written into blocks in the memory buffer in a format for random access storage. That is, the data is not stored in an input buffer, but rather, upon reading the data from the network the data is transferred immediately into random access storage formatted blocks in the memory buffer. This reduces memory and processor resources required for restoring archived data. Again this does not effect the need for any buffer in the sequential access storage system.

In a preferred embodiment, the server first creates a list of portions of the buffer into which the data on the network input are to be moved, communicates with the sequential storage system, and then executes the list and provides any handshaking required with the sequential storage system in the process to restore the archived data. The items in the list contains an address of a portion of the random access storage formatted data in the memory buffer and contains the size of the respective portion of data. Preferably a single architected instruction executes the restore list and the list is allowed to contain an arbitrary number of address-size items.

In a similar manner, in another aspect of the invention, the operations of the multimedia server during recording and playing of a multimedia data stream are modified to reduce memory and processing requirements. Again, the server stores multimedia data in a buffer in the memory of the server in blocks formatted for random access storage (disk format).

During playing in the invention, the server reads the data from the random access formatted blocks in the memory buffer and writes such data as a multimedia data stream onto a network output that communicates with peripheral equipment of the multimedia data server. That is, the data is not stored in an output buffer, but is directly written as reformatted data onto the output of the server. This reduces memory and processor resources required for playing the multimedia data stream. Note that the peripheral equipment may have a buffer, for example, in a frame editor to hold the frame being edited. The invention does not directly effect the need for such a buffer, but rather, the total amount of memory buffer needed in the system is generally reduced while providing the same level of performance.

In a preferred embodiment, the server creates lists of portions of the data in the buffer to move to the network output, and then executes the lists in a process to play the data stream. The items in the list contains an address of a portion of the random access storage formatted data in the memory buffer and contains the size of the respective portion. The list may also contain timing information for forming a stream. Preferably a single architected instruction executes the play list and the list is allowed to contain an arbitrary number of address-size items.

During recording of a multimedia data stream in the invention, the stream of data is read from a network input that communicates with the peripheral device and such data is written into blocks in the memory buffer in a format for random access storage. That is, the data is not stored in an input buffer, but rather, upon reading the data from the network the data is transferred immediately into random access storage formatted blocks in the memory buffer. This reduces memory and processor resources required for recording multimedia data files. Again this does not effect the need for any buffer in the sequential access storage system.

In a preferred embodiment, the server creates lists of portions of the buffer into which the data on the network input are to be moved, and then executes the lists in the process to record the multimedia data. The items in the list contain an address of a portion of the random access storage formatted data in the memory buffer and contain the size of the respective portion of data. Preferably a single architected instruction executes the record list and the list is allowed to contain an arbitrary number of address-size items.

The invention may be implemented by programming a general purpose server to provide the above multimedia server functions.

Those skilled in the art can understand the invention and additional objects and advantages of the invention by studying the description of preferred embodiments below with reference to the following drawings which illustrate the feature of the appended claims:

DETAILED DESCRIPTION OF THE PREFERRED EMBODIMENTS

Figure 1:
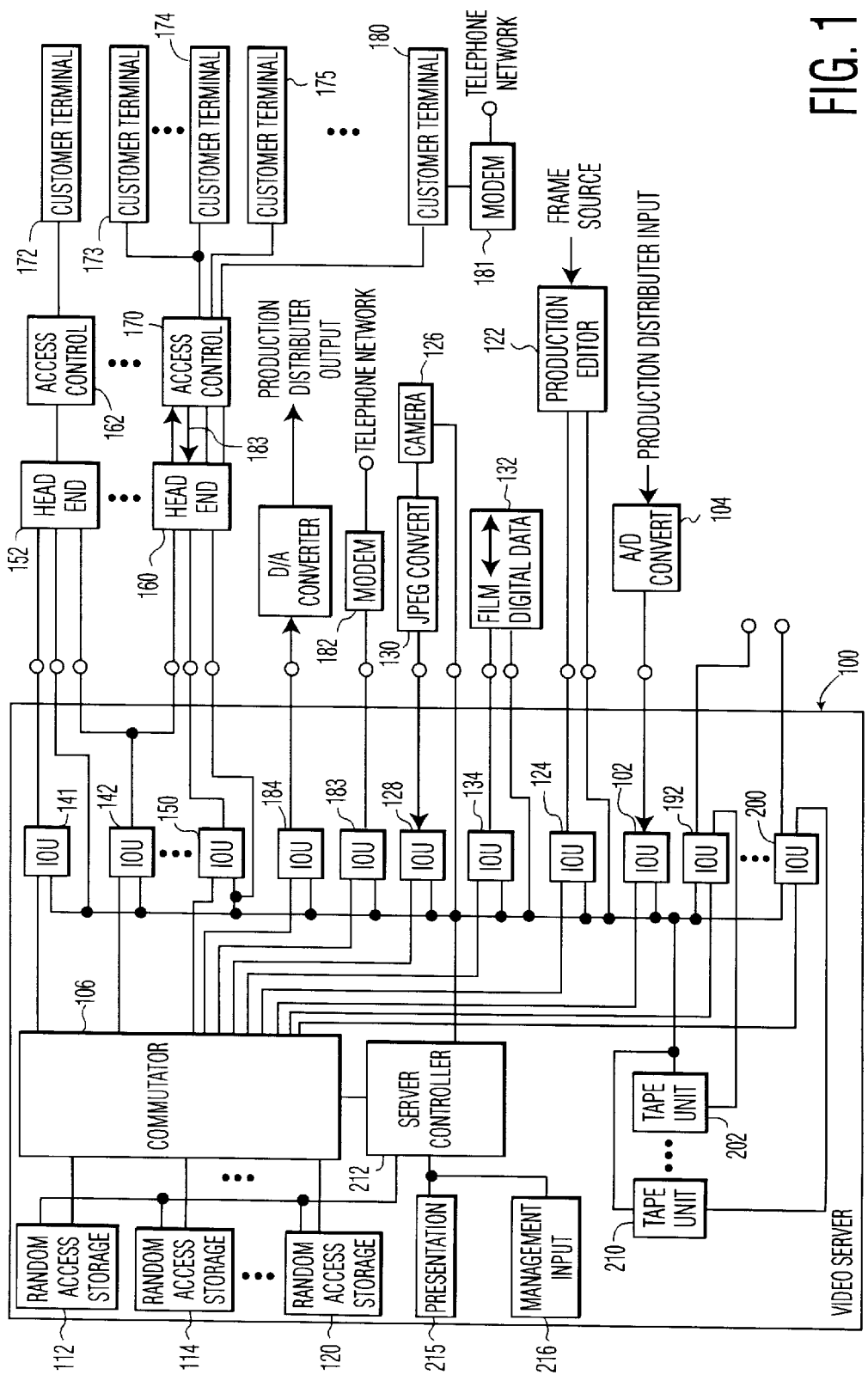
FIG. 1 shows a specific embodiment of the system of the invention for moving multimedia data from disk formatted blocks in a memory buffer and a multimedia network using a single step.

In the drawings, the same labels may be used in different drawings for similar methods or apparatus or different labels may be used. Also, communication links that do not have arrows may be bi-directional.

FIG. 1 shows a specific example embodiment of a system of the invention, including a portion of video server 100 of the invention for moving data between disk formatted blocks in a buffer in the memory and another format on a network. The system receives multimedia data streams for productions from providers through input and/or output unit (IOU) 102. If required, analog to digital converter 104 is provided to convert the data stream from analog to digital form. As described below, the multimedia data stream is converted into fixed size blocks of data suitable for random access storage in video, audio, and auxiliary files. The blocks are distributed by commutator 106 across multiple random access storage systems (RASSs) 112–120. JPEG video frame and possibly audio channels may also be input or modified using production editor 122 and routed through IOU 124. The system also receives input from digital camera 126 through IOU 128 after conversion to a motion JPEG video stream in JPEG converter 130. Finally, the system receives input of a motion JPEG video stream through film to digital data converter 132 through IOU 134.

Commutator 106 may be any type of a network of connections between two groups of terminals which allows for a cycling of connected terminals. That is, each terminal of the first group connects in turn with each of the terminals in the second group. Preferably the commutator is an M by N switching network, controlled by a service controller discussed below. Only one video server is shown with one commutator, but a server may include multiple commutators connected, for example, through a video switcher to the I/O units. Alternately, multiple video servers may be provided for one cable system with, for example, connections between several video servers and each head end.

Preferably, each RASS includes a SCSI disk controller and up to 14 random access storage devices such as hard disk drives or optical disk drives, but other types of storage systems could be used. Herein, the term "disk" is generally used to refer to any type of random access storage unit because disks are the predominate type of such random access storage units. Only a few RASSs are shown, but a typical video server should have a large number of such storage systems, limited only by the number of connections provided through the commutator. In a simple embodiment all the files of the system are striped across all the RASS's and the number of I/O units that can be connected equals the number of RASSs in a simple periodically-cycling, circular-shifting, round-robin connection scheme so that each IOU in turn accesses each RASS once in every cycle and every IOU is connected to a different RASS and every RASS is connected to a different IOU and thus, every IOU can potentially access all the portions of all the files during every connection cycle. Alternately, more complex storage and access scheduling can be provided to, for example, allow more IOUs than RASSs and different access periods for different IOUs depending on the I/O bandwidth requirements and criticality of the IOUs. IOUs which do not need disk access at a particular time, may not be connected to the RASS at all. Redundancy may be provided for the RASSs to prevent data loss, but for video systems it is not generally required since disk controllers are typically highly reliable.

The multimedia data stream may be an analog NTSC video signal, a digital MPEG2 stream of packets, or a motion JPEG data stream. The provider may supply the production through a satellite downlink (not shown), through a dedicated line (not shown), or by providing media (not shown) that are played on a VCR or other device (not shown). For clarity, only one IOU for receiving input from providers is shown, but a typical cable distributor may simultaneously receive input from over 100 channels. Preferably, the video files are stored in JPEG format to allow editing in production editor 122. Alternately the video files may be stored in MPEG frame groups, for example, groups of 9 frames padded to make each group equal size. The blocks of data for each of the files are striped across the RASSs. Preferably, at least one of the storage units provides redundant data to speed up access and/or prevent data loss.

Productions are played for cable service viewers by reading fixed size disk blocks for multiple files from a multitude of the RASSs 112–120 for each file, routing the data through commutator 106, converting the fixed size data blocks to a multimedia data stream in IOUs 142–150 and transmitting the data streams from the video server to one or more head-ends 152–160. The data streams are then routed to access control units 162–170 near one or more of the viewers, and the to multimedia terminals 172–180 for the viewing customers.

A separate head-end is provided for each independent area or for other grouping of subscribers of the cable distribution network, and each head end may have over 100 channel inputs. Even though many or even all of the channel inputs to the head-ends may be from the video server, only a few such inputs are shown for clarity. Typically, the data stream is routed from each head end to thousands or hundreds of thousands of local access control units, even though only one access control unit is shown for clarity. Ten to one hundred viewers are usually serviced by each access control unit, but only one or a few are shown for clarity. Multiple viewer terminals 173, 174 may be connected to each output of an access control unit, and some households with multiple viewer terminal may use multiple outputs of the access control unit. The viewer terminals allow display of the multimedia productions.

In addition, the viewer terminals may provide for inputting access requests, inputting control commands, telephone connection, internet connection, or even to transmit multimedia data back the video server. The terminal may include apparatus for requesting access to multimedia productions and controls for video-on-demand functions discussed above. The viewer terminal may include a camera and microphone (not shown) for video conferencing or for authoring multimedia productions. The viewer may be able to edit frames and to upload productions from a frame editor or VCR into private or shared storage in the video server for later viewing. A path may be provided from viewer terminals back to the video server by the telephone system, the cable system or by some combination. For example, data may be transmitted through modem 181 to a telephone connection, then from a telephone connection through modem 182 and IOU 183 to the video server for access requests, control commands, internet page requests. Alternatively, transmission may occur through an available channel to the access control units, then through a separate return cable 183 for terminal input back to the head end, and then from the head end to an IOU.

Multimedia productions may be provided to another production distributor such as another cable distributor, news network or program provider through IOU 184 and digital to analog (D/A) converter 185 if required. Not shown are satellite up-link, dedicated cable, or VCR recorder to transmit the signal to the other distributor.

Data which is not immediately required may be archived from RASSs 112–120, through commutator 106, through IOUs 192–200, to recording/reproducing units 202–210 for recording on removable media. The IOUs may have other connections for input or output, as previously described in relation to the other IOUs.

Figure 2:
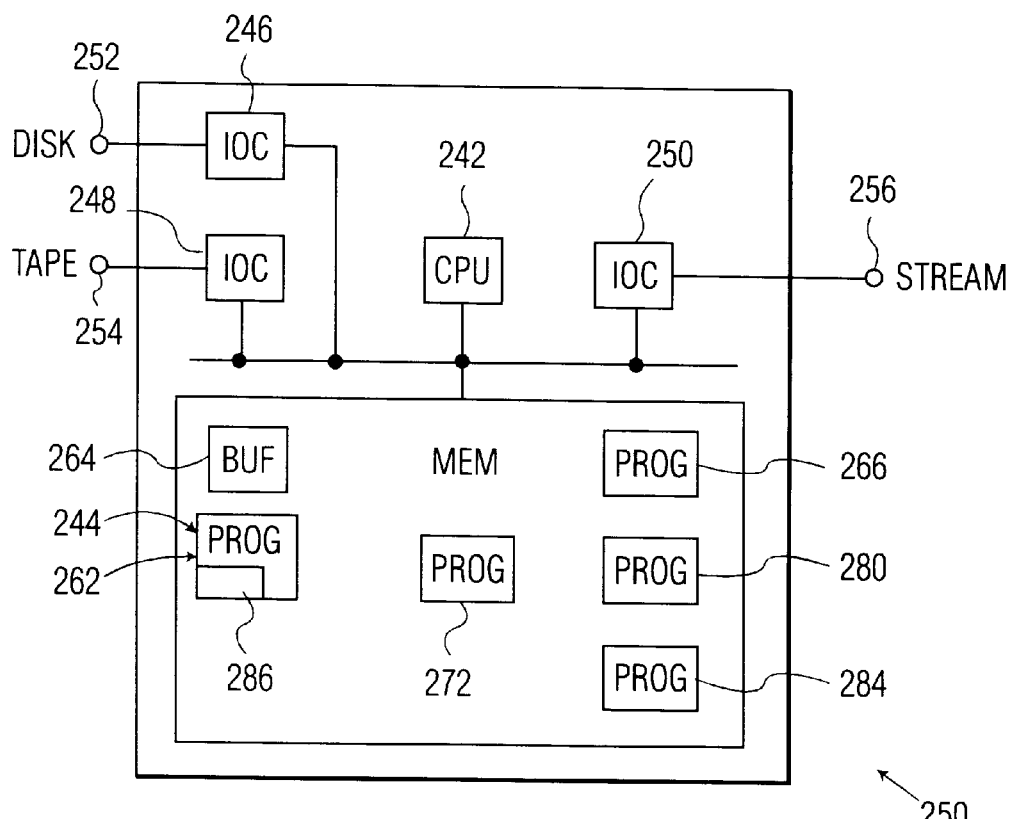
FIG. 2 illustrates a multimedia input and/or output unit for moving data files of a multimedia production between disk formatted blocks in a buffer in a memory and the network in a specific embodiment of the invention.

FIG. 2 shows an embodiment of the IOU 240 of the invention with a micro-controller (CPU) 242 connected through a bus with memory 244 and with input and/or output circuits (IOCs) 246, 248 and 250. The IOU has a terminal 252 for connection to the commutator through IOC 246, a terminal 254 for connection to a tape unit through IOC 248, and a terminal 256 for connection to a multimedia data stream through IOC 250. Preferably IOC 246 includes SCSI controller apparatus to operate a SCSI tape unit, and the tape controller portion may be external or part of the internal circuit as shown.

In an archiving process, program module 262 controls the CPU 242 and IOC 246 to request and receive fixed size file blocks formatted for random access storage from files striped across RASSs 112–120, and to store such file blocks into contiguous buffer 264 of memory 244. Program module 262 directs IOC 256 to request blocks of auxiliary, audio, and video data from disk files, as required to supply the data from buffer 264. Program module 266 controls the CPU to reformat or convert the blocks formatted for random access storage in buffer 264 into data formatted for sequential access storage which is output to terminal 564. In the conversion, portions of the data in the blocks for random access storage are copied into blocks of a different, preferably larger, fixed size for sequential access storage e.g. onto digital tape. Typically, tape blocks are several times larger than disk file blocks. Preferably, blocks from the video, audio and auxiliary files are all packed into the tape blocks and saved to tape in approximately the sequential temporal order that the information is required to play the production. The information is stored so that the data can be easily unpacked from the tape blocks back into blocks for the hard drive. Then the data in buffer 264 that has already been converted is deleted (marked as being free) to provide space for additional blocks from random access storage files. Copying data in combination with deleting the original is generally referred to as moving data.

In one embodiment of the invention, at the same time that data is being archived from random access storage to sequential storage, the data may also be played using the same IOU. Program module 272 controls the CPU to convert the data in buffer 264 from blocks formatted for random access into data for a multimedia data stream, and controls the CPU and IOC 250 so as to play a multimedia data stream directly from buffer 264 through IOC 250. Preferably, at least parts of modules 272 and 276 are also used for providing a multimedia data stream from IOC 250 when no archiving is occurring as in IOUs 141–150 and 184 in FIG. 1.

In a restoring process, program module 280 controls the CPU and IOC 248 to request and receive data formatted for sequential access from one of the digital tape units 202–210. The data is retrieved through IOC 248, converted into disk formatted data blocks and stored into buffer 264 for storage. Then program 284 controls the transfer of the blocks of data from buffer 264, through IOC 246, through the commutator 106, (see FIG. 1) and to strips the data across the disk storage systems 112–120.

In another specific embodiment of the invention, at the same time that archived data is being restored from the tape drives to the hard drives, the same IOU can also play the multimedia production. Program 272 controls the CPU and IOC 250 to reformat or convert the data in buffer 264 from blocks formatted for random access into data for a multimedia data stream, and to play a multimedia data stream from buffer 274 through IOC 260.

Preferably, IOU 240 is also able to play a multimedia production when another IOU is restoring archived data from one of the tape units to random access storage. Program module 262 controls the CPU 242 and IOC 246 to request and receive fixed size file blocks formatted for random access storage from files striped across a plurality of RASSs 112–120 and to store such file blocks into contiguous buffer 264. Preferably, program module 262 includes section 286 for requesting file blocks as soon as sufficient blocks have been stored into files striped across the random access storage system to begin forming multimedia data for a data stream i.e. while data is being written to the files, data is read from earlier portions of the files. Program module 262 directs IOC 256 to request blocks of time code data, audio, and video data from disk, as required to supply data from buffer 264. Then as described above, program 272 controls the CPU to convert the data in buffer 264 from blocks formatted for random access into data for a multimedia data stream, and to play a multimedia data stream through IOC 260.

Figure 3:
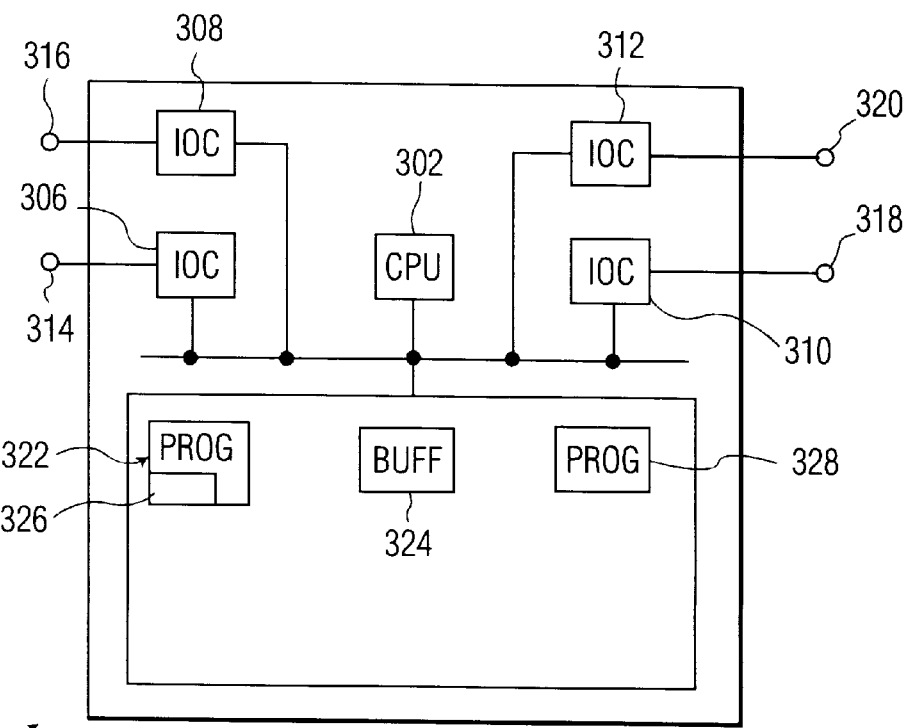
FIG. 3 illustrates another embodiment of a multimedia input and/or output unit for moving data files of a multimedia production between disk formatted information blocks in a buffer in a memory and the network.

FIG. 3 shows another embodiment 300 of an IOU for playing a multimedia production while another IOU is restoring the production from an archival tape. IOU 300 includes embedded micro controller 302 connected through a bus with memory 304 and I/O processors 306, 308, 310 and 312. IOC 306 is connectable to the commutator 106 through input terminal 314 and IOC 308 is connectable to service controller 212 (of FIG. 1) through control terminal 316. IOC 310 is connectable destination for a multimedia data stream through output terminal 318, and IOC 312 is connectable to the multimedia destination to receive controls such as production requests, play, reverse, fast forward, rewind, pause.

Program module 322 controls IOC 306 and the CPU to transmit requests for blocks of data to service controller 212 (see FIG. 1). The service controller schedules access through commutator 106 (see FIG. 1) and commands the storage system to provide blocks of data through the commutator and input terminal 316 to the IOU. Program module 322 then stores such blocks of data into buffer 324. Preferably, program module 322 includes programmed apparatus 326 for accessing files which are in the process of being restored by another IOU. Typically the request is for specific blocks from multiple files in the RASSs including video, audio and auxiliary files. Program 328 controls the CPU to convert the blocks formatted for random access storage into data for providing a multimedia data stream and to receive service commands discussed above, from the destination viewer (not shown) through terminal 318 and IOC 310. Program module 328 communicates with other program modules such as program module 322, to provide the requested services, and program module 322 plays the multimedia data stream through IOC 312 and terminal 320 to the destination viewer.

Figure 4:
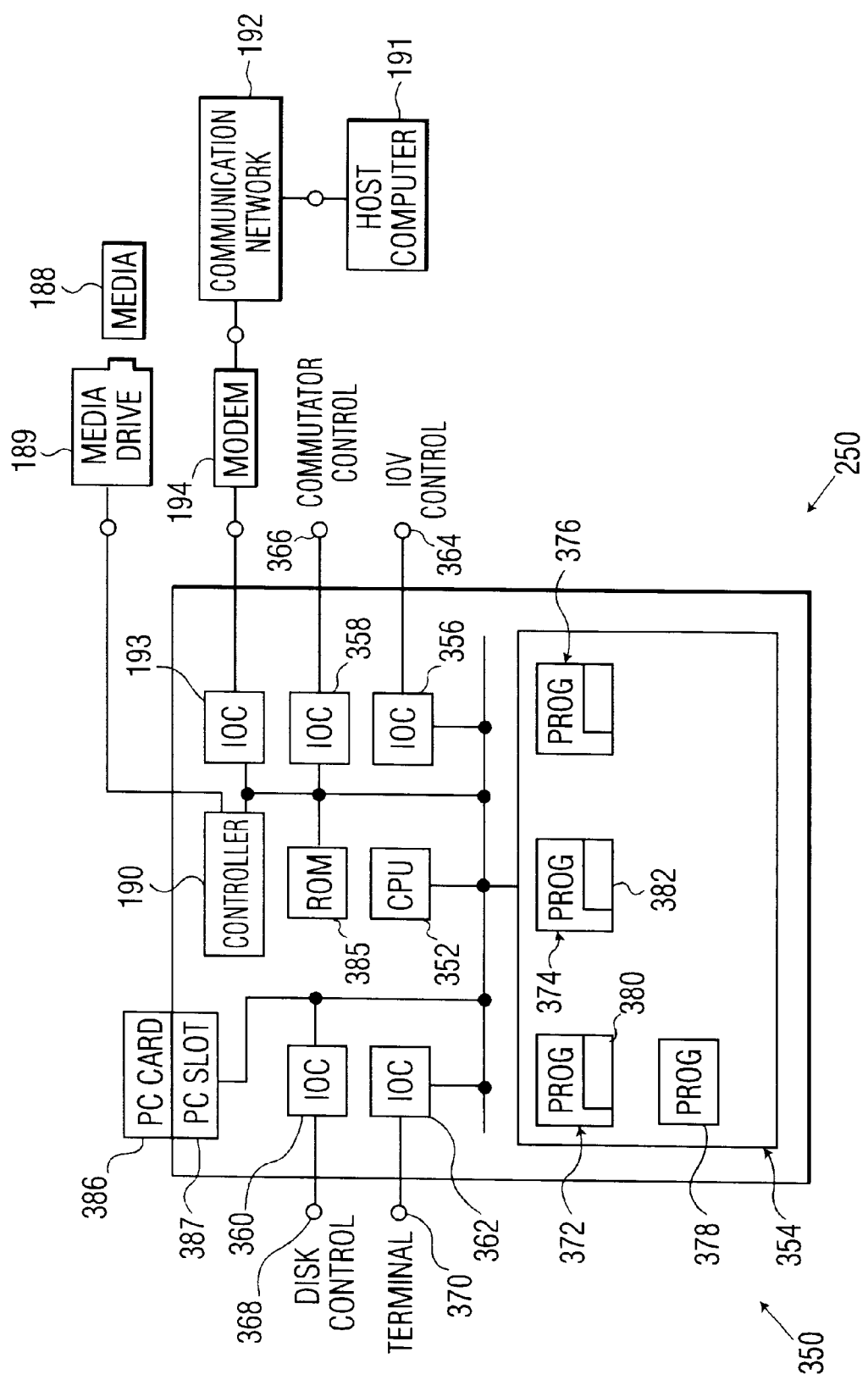
FIG. 4 shows details of a specific embodiment of the service controller of the invention for controlling the process for moving multimedia data from disk formatted blocks in a memory buffer and a multimedia network using a single step including the movement of disk blocks between the disk storage system and the input and/or output units.

FIG. 4 illustrates some of the details of a specific embodiment of service controller such as controller 212 of FIG. 1. Preferably the service controller is a general purpose, high performance work station with a multitasking operating system to continuously control the connections through the commutator and to service requests for file blocks from the IOUs. The operating system of the work station allows access to the CPU to be shared by several program modules taking turns one-at-a-time for a fraction of a second during each turn, so that operation of the programs appears to be simultaneous. The controller includes a central processing unit (CPU) 352 connected to electronic memory 354 and IOCs 356, 358, 360 and 362 connected with respective terminals 364, 366, 368 and 370. Program module 372 controls the CPU and IOC 356 to receive and transmit control signals to the IOUs. For example, the service controller may receive a request from one of the IOUs to read the files for a multimedia production. The files are each striped across a plurality of RASSs. Program module 372 conveys the request to program module 374 which schedules access through the commutator to read the files striped across the RASSs repeatedly sequentially in turn. Program module 374 controls the CPU and IOC 358 to communicate with the commutator. Program module 374 changes the state of the interconnection switches through the commutator in cycles so that during each cycle each IOU has access to each random access storage system across which files are striped that the IOU needs access to.

Program 376 controls the CPU and IOC 360 to transmit control signals to control the I/O of the RASSs so that blocks of data are stored or retrieved at precisely the correct time in coordination with the settings of the access switches in the commutator and resulting connections with the IOUs. Program 378 provides a user interface for imputing management commands and displaying messages and reports from the service controller to verify receipt of the commands and describe the status of the system.

Preferably, portion 380 of program 372 accepts requests to read blocks of files for a multimedia productions which is being restored from archival storage. Portion 380 allows multiple files to be simultaneously written by one IOU and read by another IOU. That is, portion 380 keeps track of which parts of the files for a production have been written, allows access to the parts for which writing is complete, and denies access to the parts for which writing is not complete. Program 374 has a portion 382 which schedules access through the commutator for reading blocks of files when access by another IOU has also been scheduled for writing blocks of the files. Program module 376 has a portion which controls the operation of the RASSs so that blocks can be read from files for a production alternately with writing blocks to the same files.

The service controller is programmable to provide the programmed apparatus (program modules, data structures and data) of the invention. The controller can be programmed by introducing signals and writing the signals to ROM 385 or the fast RAM 354. The signals may be introduced to the controller through one of the IOUs or from one of the RASSs or by replacing the ROM in a socket of a circuit board (not shown) of the controller, or by inserting a ROM cartridge 386 such as a PC card into a PC card slot 387 of the controller. The programming signals can be introduced to the service controller by inserting the replaceable media 188 such as a disk or tape into media drive 189 connected to controller 190. Alternately, the media drive may contain non-removable media and the drive is conveniently connectable/disconnectable from the controller. The media and drive cooperate to generate the programming signals. The signals can be introduced from another computer system 191 through a communication network 192 connected to IOC 193. For example an internet server can be connected through the telephone system using MODEM 194. In a similar manor the IOUs and/or RASSs may also be programmable in order to implement the invention.

Figure 5:
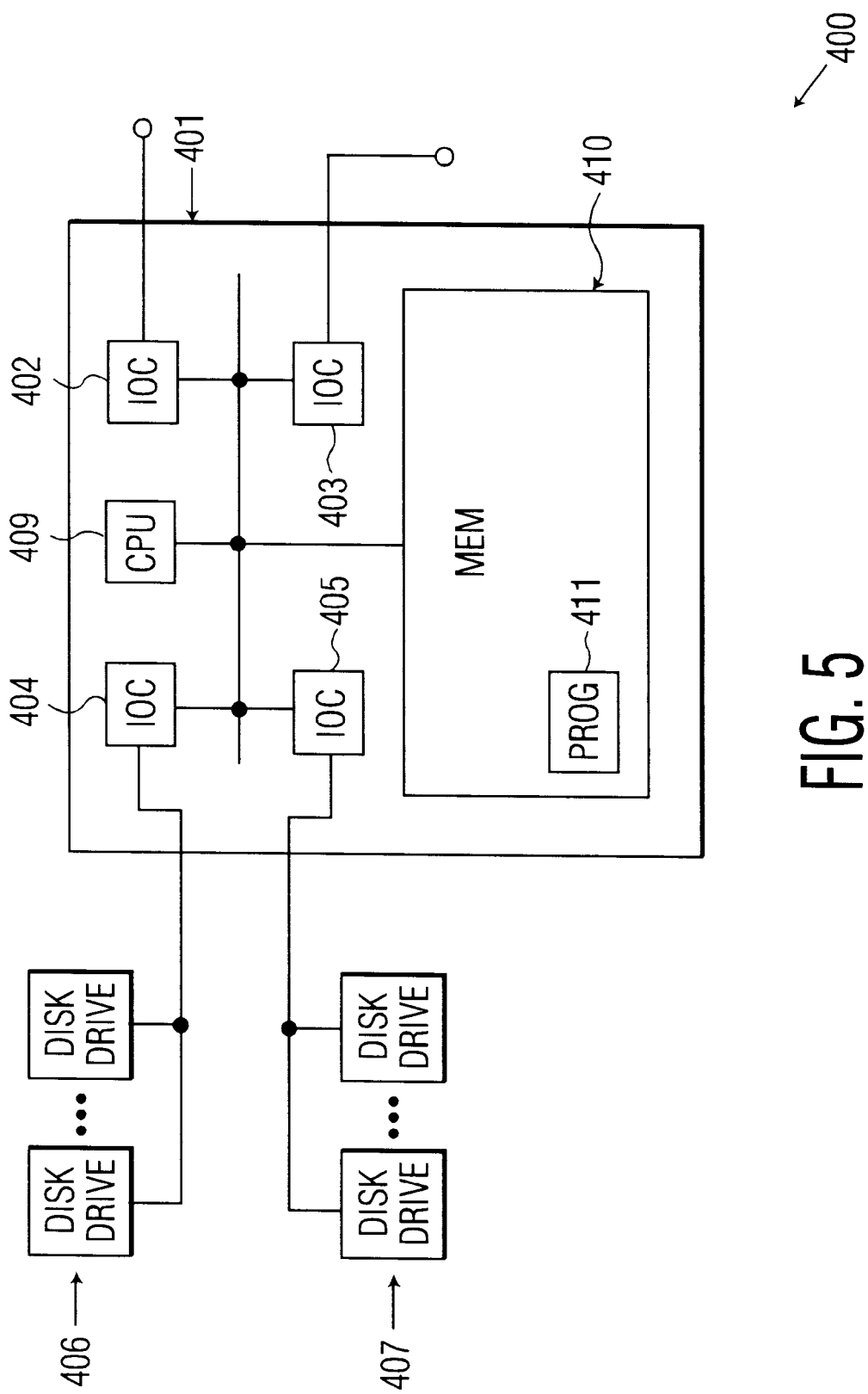
FIG. 5 is a block diagram illustrating an embodiment of a random access storage system of the invention for reading earlier portions of the files of a production as later portions are being written.
Figure 6A:
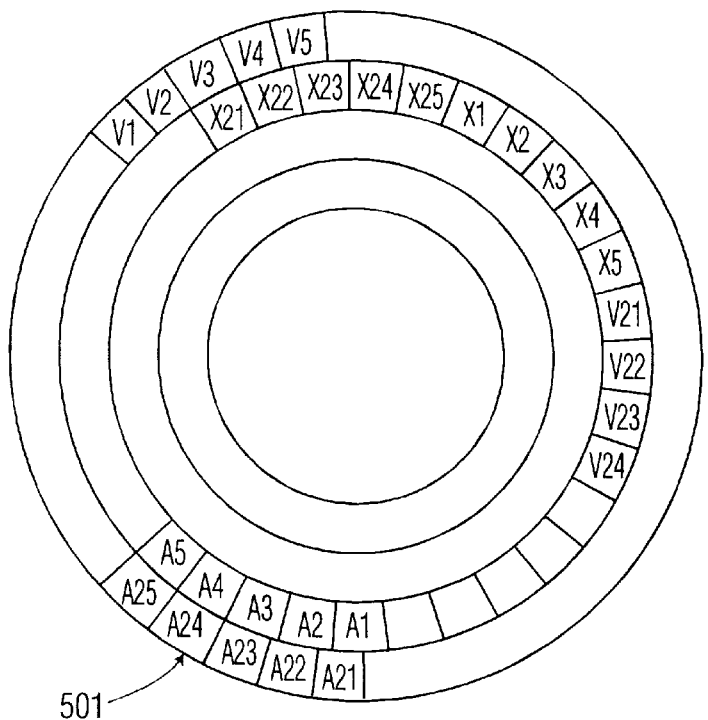
FIG. 6 schematically shows a format for the files on a hard disks of the system of the invention.
Figure 6B:
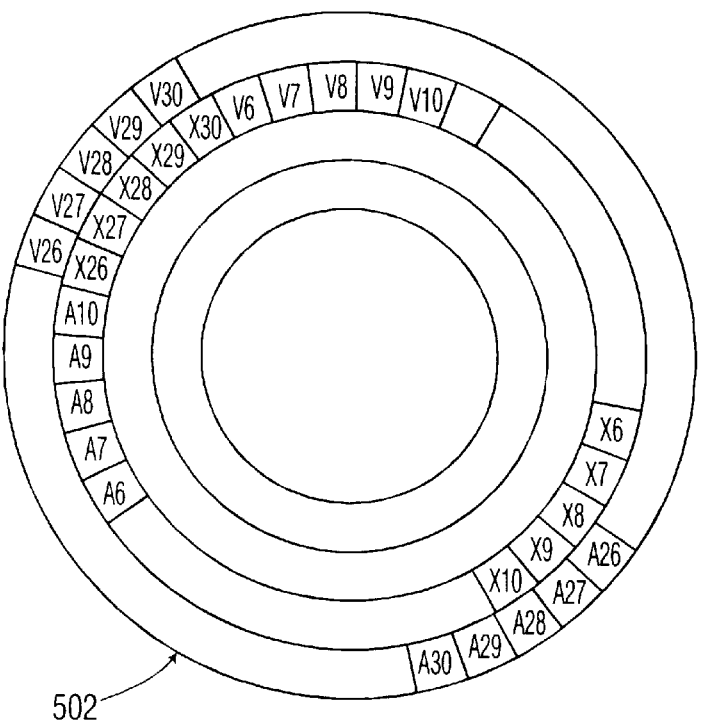
Figure 6C:
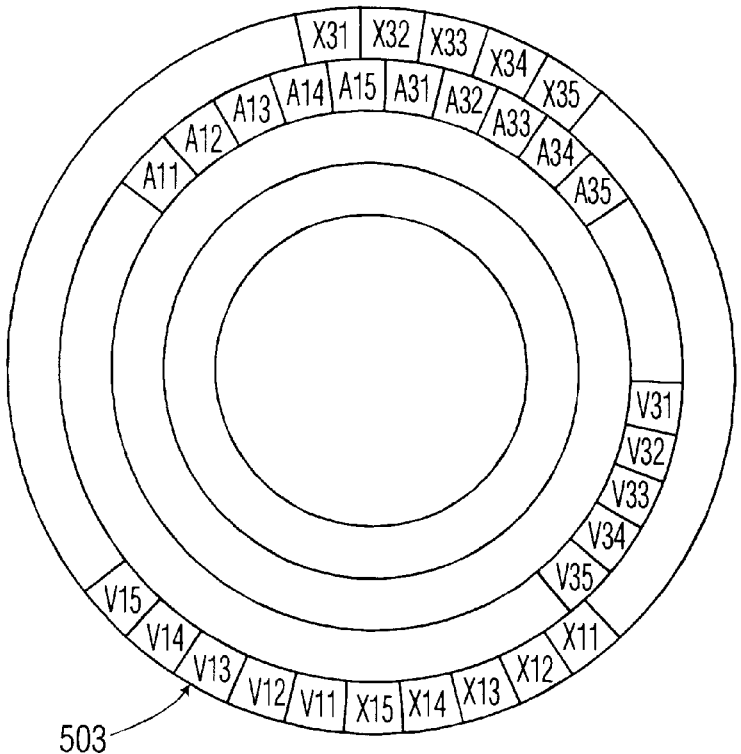
Figure 6D:
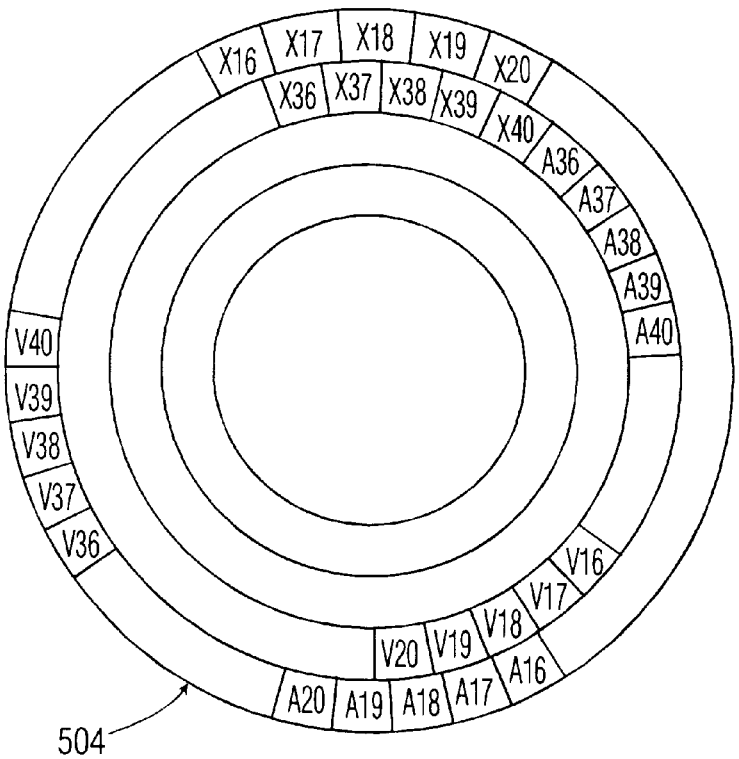

FIG. 5 illustrates an embodiment 400 of a random access storage system (RASS) of the invention. A system controller 401 may be connected through IOC 402 to communicate with the commutator 106 (see FIG. 1) and through IOC 403 to communicate with server controller 212 (see FIG. 1). The controller communicates through IOCs 404 and 405 with one or more groups of disk drives 406 and 407 respectively. Preferably, files are striped across a plurality of the disk drives with information blocks sequentially written to each drive of a parity group and parity data written to a parity drive of the group so that if one of the drives fails, the data is not lost, and system performance is not significantly degraded. Each drive such as disk drive 408 may be a magnetic hard disk, or a rewritable optical disk drive such as a DVD drive. An embedded controller (CPU) 409 is operated by programs in memory 410 which also provides buffers. Program 411 controls the CPU to allow blocks of files to be read from the system as soon as portion of blocks has been written to a file in the system.

FIG. 6 will be used to schematically illustrate the files of a multimedia production striped across multiple RASSs. Each RASS is represented by one of the disks 501, 502, 503, and 504. This system is shown with only four RASSs even though there will typically be many more RASSs. Only one disk is used to represent each RASS even though each RASS typically has up to 14 hard drives, and each hard drive typically has 5 to 10 disks. The disks are shown with four tracks each holding only about 36 blocks each, but hard drive disks typically have thousands of tracks each holding thousands of blocks of data. Typically, each IOU is connected to each RASS one-at-a-time in turn through the commutator. Of course if there are more IOUs than RASSs then during each connection cycle each IOU will take some turns being idle. For example, if the bandwidth from the RASSs through the commutator is 40 MBs, but the IOUs only need 4 MBs then a commutator allowing 10 times as many IOUs as RASSs is possible.

The number of information blocks accessed in each connection depends on the connection time between switches of the commutator and on the data rate. In this example, an IOU will access five blocks of an RASS during each connection. When a multimedia data stream is received into an IOU, the stream is converted into blocks that are formatted for storage into files on the RASSs. The blocks from the IOU are transmitted through commutator 106 and striped across files on the RASSs. Most of the data will be stored in a video file, some of the data will be stored in audio files, and some of the data will be stored into one or more auxiliary files.

As an example, the first portion of a video file is written from a first IOU. The first IOU is connected to RASS 501 and five blocks V1–V5 are written to the RASS. At the same time a second IOU is connected to RASS 502, a third IOU is connected to RASS 503 and a fourth IOU is connected to RASS 504. Then the first IOU is connected to RASS 502 and another five blocks V6–V10 are written. Again at the same time the second IOU is connected to RASS 503, the third IOU is connected to RASS 504, and the fourth IOU is connected to RASS 501. Then the first IOU is connected to RASS 503 and another five blocks V11–V15 are written, and then the first IOU is connected to RASS 504 and another five blocks V16–V20 of the video file is written.

Then, for example, a portion of the audio file for the production is written. The first IOU is reconnected to RASS 501 and five blocks A1–A5 of the audio file is written; then the first IOU is reconnected to RASS 502 and the next five blocks A5–A10 of the audio file is written; then the first IOU is reconnected to RASS 503 and the next five blocks A11–A15 of the audio file is written; and finally the first IOU is reconnected to RASS 504 and the next five blocks A16–A20 are written.

Then in a similar way, the first portion of the auxiliary file for the production is written striped across all the RASSs. The first five blocks X1–X5 are written to RASS 501; then the next five blocks X6–X10 are written to RASS 502; then the next five blocks X11–X15 are written to RASS 503; and finally, the next five blocks X16–X20 are written to RASS 504.

Sequential portions of the files for the production continue to be striped across the RASSs until the production is fully loaded into the RASSs.

Figure 7:
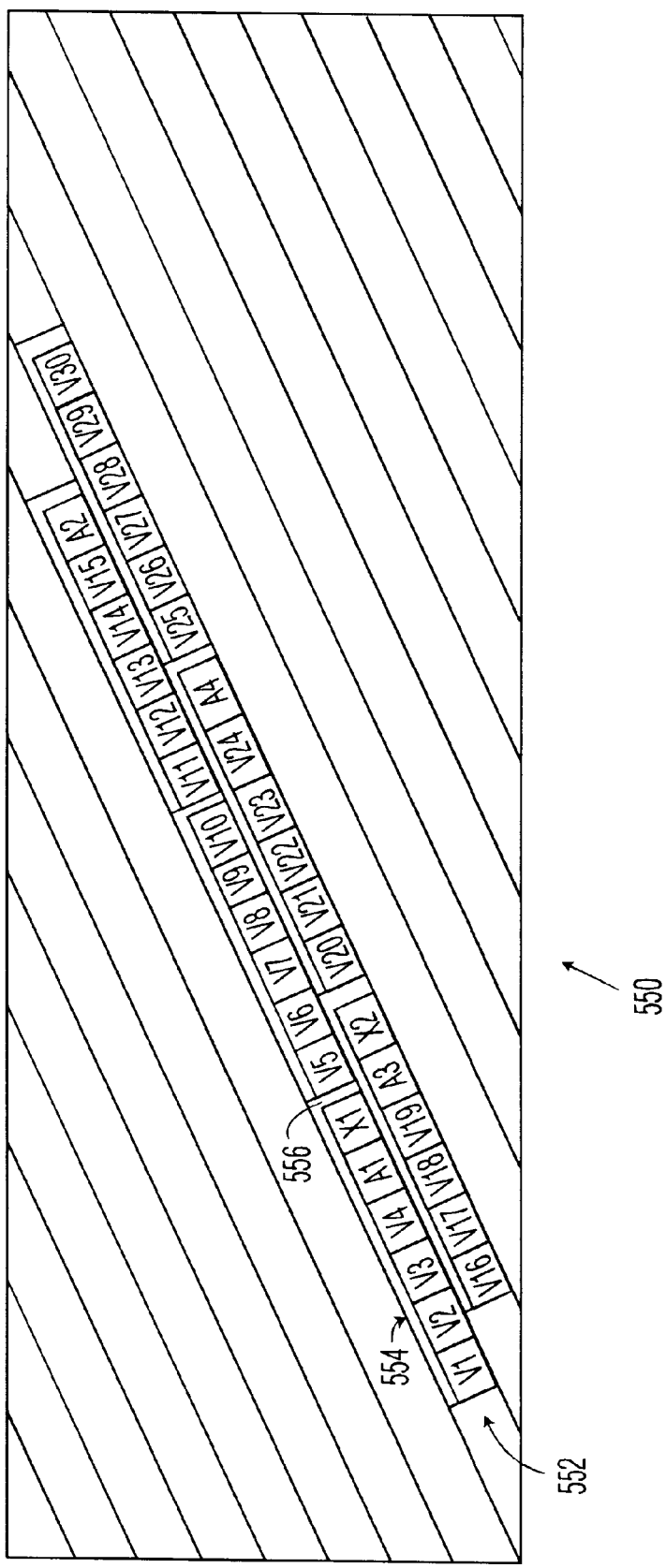
FIG. 7 schematically shows a format for the file on the tape of the invention.

FIG. 7 illustrates the files for a multimedia production that is archived interleaved in the tracks of a digital tape 550. Tracks can be written on the tape in many different ways, but is shown with slanted tracks produced by a rotating head similar to those produced by a VCR. Typically the angle between the longitudinal direction of the tape and the track will be about 6°, but is shown at a much higher angle to allow the contents of several tracks to be shown on this short segment. Typically, a large number of blocks of data will be recorded on each track, but again, the angle is exagerated so that the tracks are relatively shorter and the blocks have been made large for illustration so that each track is shown containing only three tape formatted blocks. Information from several blocks of random access storage formatted data is packed into each tape formatted block by an IOU, and the tape blocks are channel encoded and written into the tracks on the tape.

In track 552, block 554 contains the data from blocks V1–V4 of the video file, block A1 of the audio file and block X1 the auxiliary file of FIG. 6. In this particular example, each tape block holds the data from six disk blocks, error detecting and correcting data, and some space 556 in the tape blocks is used to facilitate restoring the data to the disk files, for example, to identify the file associated with each disk drive. The blocks are stored interleaved as shown in approximately the temporal order required for generating a multimedia data stream so that when restoration of the files to the hard drives begin, the disk files very quickly contain sufficient data to allow the production to be played.

Figure 8:
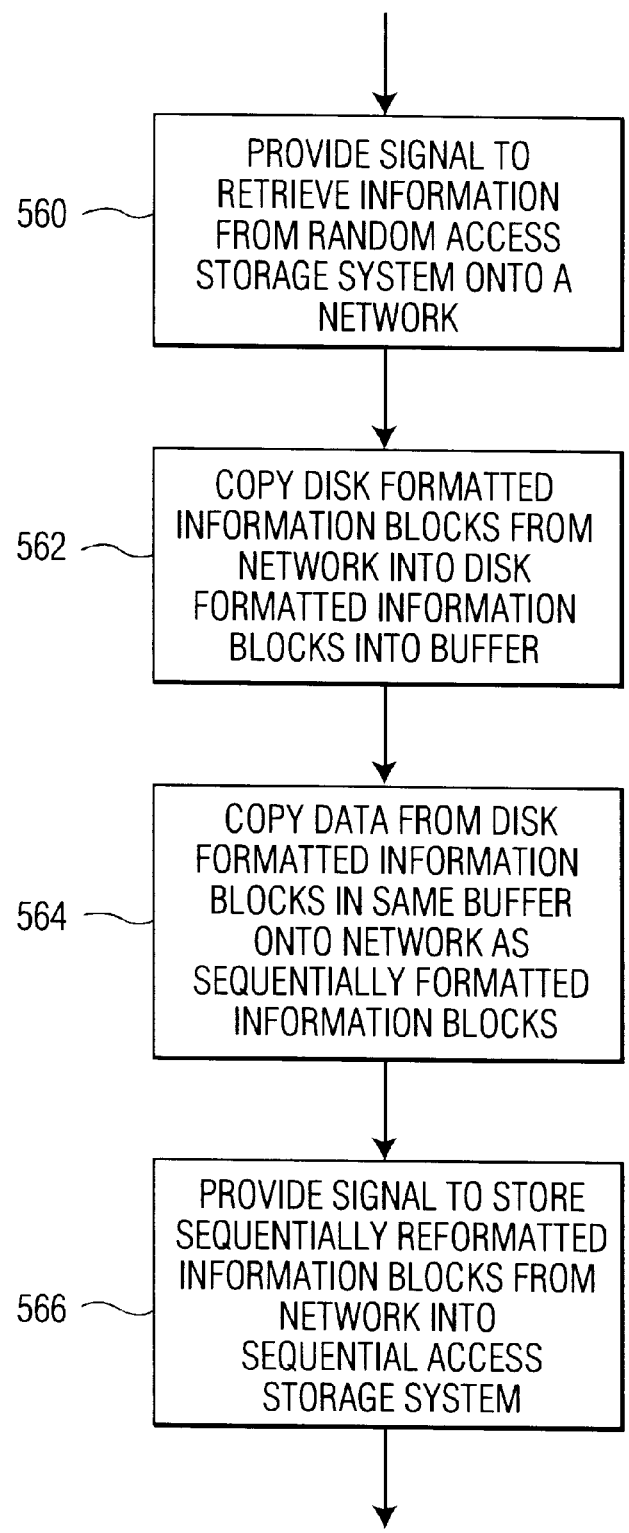
FIG. 8 illustrates an embodiment of the method of the invention.

FIG. 8 illustrates a specific embodiment of the method of the invention. Step 560 provides a signal to retrieve information from a random access storage system onto a network. Step 562 copies disk formatted information blocks from the network into disk formatted information blocks in a buffer. Step 564 copies data from the disk formatted information blocks in the same buffer onto the network as sequentially formatted information blocks. Steps 566 provides a signal to store the sequentially reformatted information blocks from the network into a sequential access storage system.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. Thus, the scope of the invention is only limited by the following claims:

I claim:

1. A computer system for archiving data, comprising:
   an electronic memory;
   means to connect a network input for communicating with the memory;
   means to connect a network output for communicating with the memory;
   disk retrieval means to provide a signal for retrieving information from files of a random access storage system onto the network input;
   disk input means to copy data of disk formatted information blocks from the network input into disk formatted information blocks in a buffer in the memory;
   sequential output means to copy data from such disk formatted information blocks in the same buffer onto the network output reformatted into sequential formatted information block which is larger than the disk formatted blocks and which contains information from a plurality of the disk formatted blocks; and
   sequential storing means to signal a sequential access storage system to store the sequential formatted information blocks from the network output.

2. The computer network of claim 1 in which:
   the bandwidth for moving data between the disk formatted blocks in the buffer and the network input is substantially greater than the bandwidth for moving and reformatting the data between the disk formatted blocks in the buffer and the network output;
   the sequential output means include means for creating a sequential output list of address-size pairs in the memory describing a process for moving portions of data from the disk formatted blocks in the buffer onto the network output in blocks formatted for sequential access storage;
   the sequential output means include means for executing movement of the data from the disk formatted blocks in the buffer onto the network output in blocks formatted for sequential access storage, using a single archetected instruction, and according to the sequential output list of address-size pairs;

the network further comprises sequential retrieval means to provide a signal for retrieving information from the sequential access storage system onto the network input;

the network further comprises sequential input means to copy information of sequential formatted information blocks from the network input reformatted into multiple disk formatted information blocks, for each sequential formatted information block, in the buffer in the memory;

the sequential input means include means for creating a sequential input list of address-size pairs in the memory describing a process for moving portions of data from the network input in blocks formatted for sequential access storage into the buffer in blocks formatted for random access storage;

the sequential input means include means for executing movement of the data from the network input in blocks formatted for sequential access storage into the buffer in blocks formatted for random access storage, using a single archetected instruction, and according to the sequential output list of address-size pairs;

the network further comprises disk output means to copy data directly from such disk formatted information blocks in the same buffer, used by the sequential input means, onto the network output as disk formatted information blocks using a single archetected instruction;

the network further comprises disk storing means to signal the random access storage system to store disk formatted information blocks from the network output;

the network further comprises stream output means to copy data directly from such disk formatted information blocks in the same buffer, used by the disk input means onto the network output as a multimedia data stream played in real time;

the stream output means include means for creating a stream output list of address-size pairs in the memory describing a process for moving portions of data from the disk formatted blocks in the buffer onto the network output as a multimedia data stream;

the stream output means include means for executing movement of the data from the disk formatted blocks in the buffer onto the network output as a multimedia output stream, using a single archetected instruction, and according to the stream output list of address-size pairs;

the network further comprising stream playing means to signal a destination of a multimedia data stream to synchronize receiving the stream from the network output;

the network further comprising stream recording means to provide a signal to initiate receiving information from a source of a multimedia data stream onto the network input;

the network further comprises stream input means to copy data of the multimedia data stream from the network input into a multitude of disk formatted information blocks in the buffer;

the stream input means include means for creating a stream input list of address-size pairs in the memory describing a process for moving portions of data from the network input in a multimedia data stream into the buffer in blocks formatted for random access storage;

the stream input means include means for executing movement of the data from the network input in a multimedia data stream, into the buffer in blocks formatted for random access in the buffer, using a single archetected instruction, and according to the stream input list of address-size pairs;

a processor provides communication between the network input and the memory and between the memory and the network output;

the disk input means includes a disk input program module in the memory to control the processor to copy data from disk blocks in the network input into disk blocks in the buffer;

the sequential output means includes a sequential output program module in the memory to control the processor to copy the data in the disk blocks in the buffer into the sequential formatted blocks in the network output;

the network further comprises archiving means for the disk input program module and the sequential output program module to both control the same processing unit in short periods at interleaved times;

the disk output means includes a disk output program module in the memory to control the processor to copy data from disk blocks in the buffer into disk blocks in the network output;

the sequential input means includes a sequential input program module in the memory to control the processor to copy the data in the disk blocks in the network input into the sequential formatted blocks in the buffer;

the network further comprises restoring means for the sequential input program module and the disk output program module to both control the same processing unit in short periods interleaved in time to restore data from the sequential access storage system into the random access storage system;

the stream input means includes a stream input program module in the memory to control the processor to copy the data in the multimedia data stream in the network input into the disk formatted blocks in the buffer;

the network further comprises recording means for the stream input program module and the disk output program module to both control the same processing unit in short periods interleaved in time to record a multimedia data stream from the network input into the random access storage systems;

the stream output means includes a stream output program module in the memory to control the processor to copy data from disk formatted blocks in the buffer into a multimedia data stream in the network output;

the network further comprises playing means for the disk input program module and the stream output program module to both control the same processing unit in short periods at interleaved times to play a multimedia production from the random access storage system onto the network output;

the multimedia data in random access storage includes multiple files including at least one video file and at least one audio file and at least one auxiliary file containing timing data for generating a multimedia data stream;

the data in random access storage is formatted into fixed size blocks of a first size and the data in sequential storage is formatted into fixed size blocks of a different larger second size; during archiving, information from multiple blocks of disk formatted data is copied into one block of sequential access formatted data; and during restoring data from one block of sequential access formatted data is copied into multiple blocks of disk formatted data;

the fixed size blocks of the second size are at least twice as large as the fixed size blocks of the first size;

the fixed size blocks of the second size contain six fixed size blocks of the first size;

the multimedia data in sequential access storage include one file with data from multiple random access files including at least a video file, an audio file, and an auxiliary file, with the data from the different files interleaved in approximately the temporal order in which the data is required for playing a production;

the multimedia data in sequential access storage includes additional information for restoring the multimedia data into multiple files in random access storage;

the audio files in random access storage include at least 2 files and each audio file includes means for producing an independent audio channel; and the video files in random access storage includes multiple bit reduced images in JPEG format.

3. A computer network for restoring data, comprising:

an electronic memory;

means to connect a network input for communicating with the memory;

means to connect a network output for communicating with the memory;

sequential retrieval means to provide a signal for retrieving information from a sequential access storage system onto the network input;

sequential input means to copy information of sequential formatted information blocks from the network input reformatted into multiple disk formatted information blocks, for each sequential formatted information block, in a buffer in the memory;

disk output means to copy data directly from such disk formatted blocks in the same buffer onto the network output as disk formatted information blocks; and disk storing means to signal a random access storage system to store disk formatted information blocks from the network output.

4. The computer network of claim 3 in which:

the network further comprises disk retrieval means to provide a signal for retrieving information from files of a random access storage system onto a network input;

the network further comprises disk input means to copy data of disk formatted information blocks from the network input into disk formatted information blocks in a buffer in the memory;

the network further comprises sequential output means to copy data from such disk formatted information blocks in the same buffer onto the network output reformatted into sequential formatted information blocks; and the sequential output means include means for creating a sequential output list of address-size pairs in the memory describing a process for moving portions of data from the blocks in the buffer, formatted for random access onto the network output in blocks formatted for sequential access storage;

the sequential output means include means for executing movement of the data from the blocks in buffer, formatted for random access onto the network output in blocks formatted for sequential access storage, using a single archetected instruction, and according to the sequential output list of address-size pairs;

the network further comprises sequential storing means to signal a sequential access storage system to store the sequential formatted information blocks from the network output;

the sequential input means include means for creating a sequential input list of address-size pairs in the memory describing a process for moving portions of data from the network input in blocks formatted for sequential access storage into the buffer in blocks formatted for random access storage;

the sequential input means include means for executing movement of the data from the network input in blocks formatted for sequential access storage, into the buffer in blocks formatted for random access storage, using a single archetected, instruction and according to the sequential input list of address-size pairs;

the network further comprises stream output means to copy data directly from such disk formatted information blocks in the same buffer, used by the disk input means, onto the network output as a multimedia data stream played in real time;

the stream output means include means for creating a stream output list of address-size pairs in the memory describing a process for moving portions of data from the disk formatted blocks in the buffer onto the network output as a multimedia data stream;

the stream output means include means for executing movement of the data from the disk formatted blocks in the buffer onto the network output as a multimedia output stream, using a single archetected instruction, and according to the stream output list of address-size pairs;

the network further comprising stream playing means to signal a destination of a multimedia data stream to synchronize receiving the stream from the network output;

the network further comprising stream recording means to provide a signal to initiate receiving information from a source of a multimedia data stream onto the network input;

the network further comprises stream input means to copy data of the multimedia data stream from the network input into a multitude of disk formatted information blocks in the buffer;

the steam input means include means for creating a stream input list of address-size pairs in the memory describing a process for moving portions of data from the network input in a multimedia data stream into the buffer in blocks formatted for random access storage;

the stream input means include means for executing movement of the data from the network input in a multimedia data stream, into the buffer in blocks formatted for random access in the buffer, using a single archetected instruction, and according to the stream input list of address-size pairs;

a processor provides communication between the network input and the memory and between the memory and the network output;

the disk input means includes a disk input program module in the memory to control the processor to copy data from disk blocks in the network input into disk blocks in the buffer;

the sequential output means includes a sequential output program module in the memory to control the processor to copy the data in the disk blocks in the buffer into the sequential formatted blocks in the network output;

the network further comprises archiving means for the disk input program module and the sequential output program module to both control the same processing unit in short periods at interleaved times;

the disk output means includes a disk output program module in the memory to control the processor to copy data from disk blocks in the buffer into disk blocks in the network output;

the sequential input means includes a sequential input program module in the memory to control the processor to copy the data in the disk blocks in the network input into the sequential formatted blocks in the buffer;

the network further comprises restoring means for the sequential input program module and the disk output program module to both control the same processing unit in short periods interleaved in time to restore data from the sequential access storage system into the random access storage systems;

the stream input means includes a stream input program module in the memory to control the processor to copy the data in the multimedia data stream in the network input into the disk formatted blocks in the buffer;

the network further comprises recording means for the stream input program module and the disk output program module to both control the same processing unit in short periods interleaved in time to record a multimedia data stream from the network input into the random access storage systems;

the stream output means includes a stream output program module in the memory to control the processor to copy data from disk formatted blocks in the buffer into a multimedia data stream in the network output;

the network further comprises playing means for the disk input program module and the stream output program module to both control the same processing unit in short periods at interleaved times to play a multimedia production from the random access storage system onto the network output;

the bandwidth for moving data between the disk formatted blocks in the buffer and the network is substantially greater than the bandwidth for moving and reformatting the data between the disk formatted blocks in the buffer and the sequential formatted information blocks on the network;

the multimedia data in random access storage includes multiple files including at least one video file and at least one audio file and at least one auxiliary file containing timing data for generating a multimedia data stream;

the data in random access storage is formatted into fixed size blocks of a first size and the data in sequential storage is formatted into fixed size blocks of a different larger second size; during archiving information from multiple blocks of disk formatted data is copied into one block of sequential access formatted data; and during restoring data from one block of sequential access formatted data is copied into multiple blocks of disk formatted data;

the fixed size blocks of the second size are at least twice as large as the fixed size blocks of the first size;

the fixed size blocks of the second size contain six fixed size blocks of the fist size;

the multimedia data in sequential access storage include one file with data from multiple random access files including at least a video file, an audio file, and an auxiliary file, with the data from the different files interleaved in approximately the temporal order in which the data is required for playing a production;

the multimedia data in sequential access storage includes additional information for restoring the multimedia data into multiple files in random access storage;

the audio files in random access storage include at least 2 files and each audio file includes means for producing an independent audio channel; and the video files in random access storage includes multiple bit reduced images in JPEG format.

5. A computer network for playing a multimedia data stream, comprising:

a memory;

means to connect a network input for communicating with the memory;

means to connect a network output for communicating with the memory;

disk retrieval means to provide a signal for retrieving information from files of a random access storage system onto the network input;

disk input means to copy data of blocks of disk formatted information from the network input into disk formatted information blocks in a buffer in the memory;

stream output means to copy data directly from such disk formatted information blocks in the same buffer onto the network output reformatted as a multimedia data stream played in real time; and stream playing means to signal a destination of the multimedia data stream to synchronize receiving the stream from the network output.

6. The computer network of claim 5 in which:

the network further comprises sequential output means to copy data from such disk formatted information blocks in the same buffer onto the network output reformatted into sequential formatted information blocks;

the sequential output means include means for creating a sequential output list of address-size pairs in the memory describing a process for moving portions of data from the disk formatted blocks in the buffer onto the network output in blocks formatted for sequential access storage;

the sequential output means include means for executing movement of the data from the blocks in buffer, formatted for random access onto the network output in blocks formatted for sequential access storage, using a single archetected instruction, and according to the sequential output list of address-size pairs;

the network further comprises sequential storing means to signal a sequential access storage system to store the sequential formatted information blocks from the network output;

the network further comprises sequential retrieval means to provide a signal for retrieving information from the sequential access storage system onto the network input;

the network further comprises sequential input means to copy information of sequential formatted information blocks from the network input reformatted into multiple disk formatted information blocks, for each sequential formatted information block, in the buffer in the memory;

the sequential input means include means for creating a sequential input list of address-size pairs in the memory describing a process for moving portions of data from the network input in blocks formatted for sequential access storage into the buffer in blocks formatted for random access storage;

the sequential input means include means for executing movement of the data from the network input in blocks formatted for sequential access storage, into the buffer in blocks formatted for random access storage, using a single archetected instruction, and according to the sequential input list of address-size pairs;

the network further comprises disk output means to copy data directly from such disk formatted information blocks in the same buffer, used by the sequential input means, onto the network output as disk formatted information blocks using a single archetected instruction;

the network further comprises disk storing means to signal a random access storage system to store disk formatted information blocks from the network output;

the stream output means include means for creating a stream output list of address-size pairs in the memory describing a process for moving portions of data from the blocks in the buffer, formatted for random access, onto the network output as a multimedia data stream;

the stream output means include means for executing movement of the data from the blocks in the buffer, formatted for random access, onto the network output as a multimedia output stream, using a single archetected instruction, and according to the stream output list of address-size pairs;

the network further comprising stream recording means to provide a signal to initiate receiving information from a source at the network input;

the network further comprises stream input means to copy data of a multimedia data stream from the network input into a multitude of disk formatted information blocks in the buffer;

the steam input means include means for creating a stream input list of address-size pairs in the memory describing a process for moving portions of data from the network input in a multimedia data stream into the buffer in blocks formatted for random access storage;

the stream input means include means for executing movement of the data from the network input in a multimedia data stream, into the buffer in blocks formatted for random access in the buffer, using a single archetected instruction, and according to the stream input list of address-size pairs;

a processor provides communication between the network input and the memory and between the memory and the network output;

the disk input means includes a disk input program module in the memory to control the processor to copy data from disk blocks in the network input into disk blocks in the buffer;

the sequential output means includes a sequential output program module in the memory to control the processor to copy the data in the disk blocks in the buffer into the sequential formatted blocks in the network output;

the network further comprises archiving means for the disk input program module and the sequential output program module to both control the same processing unit in short periods at interleaved times;

the disk output means includes a disk output program module in the memory to control the processor to copy data from disk blocks in the buffer into disk blocks in the network output;

the sequential input means includes a sequential input program module in the memory to control the processor to copy the data in the disk blocks in the network input into the sequential formatted blocks in the buffer;

the network further comprises restoring means for the sequential input program module and the disk output program module to both control the same processing unit in short periods interleaved in time to restore data from the sequential access storage system into the random access storage systems;

the stream input means includes a stream input program module in the memory to control the processor to copy the data in the multimedia data stream in the network input into the disk formatted blocks in the buffer;

the network further comprises recording means for the stream input program module and the disk output program module to both control the same processing unit in short periods interleaved in time to record a multimedia data stream from the network input into the random access storage systems;

the stream output means includes a stream output program module in the memory to control the processor to copy data from disk formatted blocks in the buffer into a multimedia data stream in the network output;

the network further comprises playing means for the disk input program module and the stream output program module to both control the same processing unit in short periods at interleaved times to play a multimedia production from the random access storage system onto the network output;

the bandwidth for moving data between the disk formatted blocks in the buffer and the network is substantially greater than the bandwidth for moving and reformatting the data between the disk formatted blocks in the buffer and the sequential formatted information blocks on the network;

the multimedia data in random access storage includes multiple files including at least one video file and at least one audio file and at least one auxiliary file containing timing data for generating a multimedia data stream;

the data in random access storage is formatted into fixed size blocks of a first size and the data in sequential storage is formatted into fixed size blocks of a different larger second size; during archiving information from multiple blocks of disk formatted data is copied into one block of sequential access formatted data; and during restoring data from one block of sequential access formatted data is copied into multiple blocks of disk formatted data;

the fixed size blocks of the second size are at least twice as large as the fixed size blocks of the first size;

the fixed size blocks of the second size contain six fixed size blocks of the fist size;

the multimedia data in sequential access storage include one file with data from multiple random access files including at least video file, an audio file, and an auxiliary file, with the data from the different files interleaved in approximately the temporal order in which the data is required for playing a production;

the multimedia data in sequential access storage includes additional information for restoring the multimedia data into multiple files in random access storage;

the audio files in random access storage include at least 2 files and each audio file includes means for producing an independent audio channel; and the video files in random access storage includes multiple bit reduced images in JPEG format.

7. A computer network for recording a multimedia data stream, comprising:

a memory;

means to connect a network input for communicating with the memory;

means to connect a network output for communicating with the memory;

stream recording means to provide a signal to initiate receiving information from a source of a multimedia data stream onto the network input;

stream input means to copy data of the multimedia data stream from the network input reformatted into a multitude of disk formatted information blocks in a buffer in the memory;

disk output means to copy data of the blocks of disk formatted information from the same buffer onto the network output in disk formatted information blocks; and disk storing means to signal a random access storage system to store information from the network output.

8. The computer network of claim 7 in which:

the network further comprises disk retrieval means to provide a signal for retrieving information from files of a random access storage system onto the network input;

the network further comprises disk input means to copy data of disk formatted information blocks from the network input into disk formatted information blocks in a buffer in the memory;

the network further comprises sequential output means to copy data from such disk formatted information blocks in the same buffer onto the network output reformatted into a sequential formatted information blocks; and the sequential output means include means for creating a sequential output list of address-size pairs in the memory describing a process for moving portions of data from the blocks in the buffer, formatted for random access onto the network output in blocks formatted for sequential access storage;

the sequential output means include means for executing movement of the data from the blocks in buffer, formatted for random access onto the network output in blocks formatted for sequential access storage, using a single archetected instruction, and according to the sequential output list of address-size pairs;

the network further comprises sequential storing means to signal a sequential access storage system to store the sequential formatted information blocks from the network output;

the network further comprises sequential retrieval means to provide a signal for retrieving information from the sequential access storage system onto the network input;

the network further comprises sequential input means to copy information of sequential formatted information blocks from the network input reformatted into multiple disk formatted information blocks, for each sequential formatted information block, in the buffer in the memory;

the sequential input means include means for creating a sequential input list of address-size pairs in the memory describing a process for moving portions of data from the network input in blocks formatted for sequential access storage into the buffer in blocks formatted for random access storage;

the sequential input means include means for executing movement of the data from the network input in blocks formatted for sequential access storage, into the buffer in blocks formatted for random access storage, using a single archetected instruction, and according to the sequential input list of address-size pairs;

the network further comprises stream output means to copy data directly from such disk formatted information blocks in the same buffer, used by the disk input means, onto the network output as a multimedia data stream played in real time;

the stream output means include means for creating a stream output list of address-size pairs in the memory describing a process for moving portions of data from disk formatted the blocks in the buffer onto the network output as a multimedia data stream;

the stream output means include means for executing movement of the data from disk formatted the blocks in the buffer onto the network output as a multimedia output stream, using a single archetected instruction, and according to the stream output list of address-size pairs;

the network further comprising stream playing means to signal a designation of a multimedia data stream to synchronize receiving the stream from the network output;

the steam input means include means for creating a stream input list of address-size pairs in the memory describing a process for moving portions of data from the network input in a multimedia data stream into the buffer in blocks formatted for random access storage;

the stream input means include means for executing movement of the data from the network input in a multimedia data stream, into the buffer in blocks formatted for random access, using a single architected instruction, and according to the stream input list of address-size pairs;

a processor provides communication between the network input and the memory and between the memory and the network output;

the disk input means includes a disk input program module in the memory to control the processor to copy data from disk blocks in the network input into disk blocks in the buffer;

the sequential output means includes a sequential output program module in the memory to control the processor to copy the data in the disk blocks in the buffer into the sequential formatted blocks in the network output;

the network further comprises archiving means for the disk input program module and the sequential output program module to both control the same processing unit in short periods at interleaved times;

the disk output means includes a disk output program module in the memory to control the processor to copy data from disk blocks in the buffer into disk blocks in the network output;

the sequential input means includes a sequential input program module in the memory to control the processor to copy the data in the disk blocks in the network input into the sequential formatted blocks in the buffer;

the network further comprises restoring means for the sequential input program module and the disk output program module to both control the same processing unit in short periods interleaved in time to restore data from the sequential access storage system into the random access storage systems;

the stream input means includes a stream input program module in the memory to control the processor to copy the data in the multimedia data stream in the network input into the disk formatted blocks in the buffer;

the network further comprises recording means for the stream input program module and the disk output program module to both control the same processing unit in short periods interleaved in time to record a multimedia data stream from the network input into the random access storage systems;

the stream output means includes a stream output program module in the memory to control the processor to copy data from disk formatted blocks in the buffer into a multimedia data stream in the network output;

the network further comprises playing means for the disk input program module and the stream output program module to both control the same processing unit in short periods at interleaved times to play a multimedia production from the random access storage system onto the network output;

the bandwidth for moving data between the disk formatted blocks in the buffer and the network is substantially greater than the bandwidth for moving and reformatting the data between the disk formatted blocks in the buffer and the sequential formatted information blocks on the network;

the multimedia data in random access storage includes multiple files including at least one video file, one audio file, and one auxiliary file containing timing data for generating a multimedia data stream;

the data in random access storage is formatted into fixed size blocks of a first size and the data in sequential storage is formatted into fixed size blocks of a different larger second size; during archiving information from multiple blocks of disk formatted data is copied into one block of sequential access formatted data; and during restoring data from one block of sequential access formatted data is copied into multiple blocks of disk formatted data;

the fixed size blocks of the second size are at least twice as large as the fixed size blocks of the first size;

the fixed size blocks of the second size contain six fixed size blocks of the fist size;

the multimedia data in sequential access storage include one file with data from multiple random access files including at least video file, an audio file, and an auxiliary file, with the data from the different files interleaved in approximately the temporal order in which the data is required for playing a production;

the multimedia data in sequential access storage includes additional information for restoring the multimedia data into multiple files in random access storage;

the audio files in random access storage include at least 2 files and each audio file includes means for producing an independent audio channel; and the video files in random access storage includes multiple bit reduced images in JPEG format.

9. A multimedia data server, comprising:

a memory;

means to connect a first communications network for communicating with the memory;

means to connect a second communications network for communication with the memory;

data transfer means to copy multimedia data between disk formatted information blocks in a buffer in the memory and data in a different format on the first network, including: means for creating a list of address-size pairs in the memory describing a process for moving portions of data between the disk formatted blocks in the buffer and the first network; and means for executing movement of the data between the disk formatted blocks in the buffer and the first network, according to the list of address-size pairs;

disk transfer means to copy data in the blocks of disk formatted information between the second network and the disk formatted information blocks in the same buffer; and disk control means to signal a random access storage system to move information between the second network and the random access storage system.

10. Apparatus for programming a multimedia network for archiving data, comprising:

apparatus to provide disk retrieval means to provide a signal for retrieving information from files of a random access storage system onto a network input;

apparatus to provide disk input means to copy data of disk formatted information blocks from the network input into disk formatted information blocks in a buffer in the memory;

apparatus to provide sequential output means to copy data from such disk formatted information blocks in the same buffer onto the network output in sequential formatted information blocks; and apparatus to provide sequential storing means to signal a sequential access storage system to store information from the network output.

11. Apparatus for programming a multimedia network for restoring data, comprising:

apparatus to provide sequential retrieval means to provide a signal for retrieving information from a sequential access storage system onto a network input;

apparatus to provide sequential input means to copy information of sequential formatted information blocks from the network input into multiple disk formatted information blocks, for each sequential formatted information block, in a buffer in the memory;

apparatus to provide disk output means to copy data directly from such disk formatted blocks in the same buffer onto the network output as disk formatted information blocks; and apparatus to provide disk storing means to signal a random access storage system to store information from the network output.

12. Apparatus for programming a computer network for playing a multimedia data stream, comprising:

apparatus to provide disk retrieval means to provide a signal for retrieving information from files of a random access storage system onto a network input;

apparatus to provide disk input means to copy data of blocks of disk formatted information from the network input into disk formatted information blocks in a buffer in the memory;

apparatus to provide stream output means to copy data directly from such disk formatted information blocks in the same buffer onto the network output reformatted as a multimedia data stream played in real time; and apparatus to provide stream playing means to signal a destination of the multimedia data stream to synchronize receiving the stream from the network output.

13. Apparatus for programming a computer network for recording a multimedia data stream, comprising:

apparatus to provide stream recording means to provide a signal to initiate receiving information from a source of a multimedia data stream onto a network input;

apparatus to provide stream input means to copy data of the multimedia data stream from the network input reformatted into a multitude of disk formatted information blocks in a buffer in the memory;

apparatus to provide disk output means to copy data of the blocks of disk formatted information from the same buffer onto the network output in disk formatted information blocks; and apparatus to provide disk storing means to signal a random access storage system to store information from the network output.

14. Apparatus for programming a multimedia data server, comprising:

apparatus to provide data transfer means to copy multimedia data between disk formatted information blocks in a buffer in the memory and data in a different format on a first network, including: means for creating a list of address-size pairs in the memory describing a process for moving portions of data between the disk formatted blocks in the buffer and the network; and means for executing movement of the data between the disk formatted blocks in the buffer and the first network, according to the list of address-size pairs;

apparatus to provide disk transfer means to copy data in the blocks of disk formatted information between the second network and the disk formatted information blocks in the same buffer; and apparatus to provide disk control means to signal a random access storage system to move information between the second network and the random access storage system.

* * * * *